Dec. 15, 1959     W. C. McNABB ET AL     2,916,971
APPARATUS FOR SIMULTANEOUSLY SHAVING
AND DEBURRING THE TEETH OF GEARS
Filed Sept. 15, 1958     2 Sheets-Sheet 1
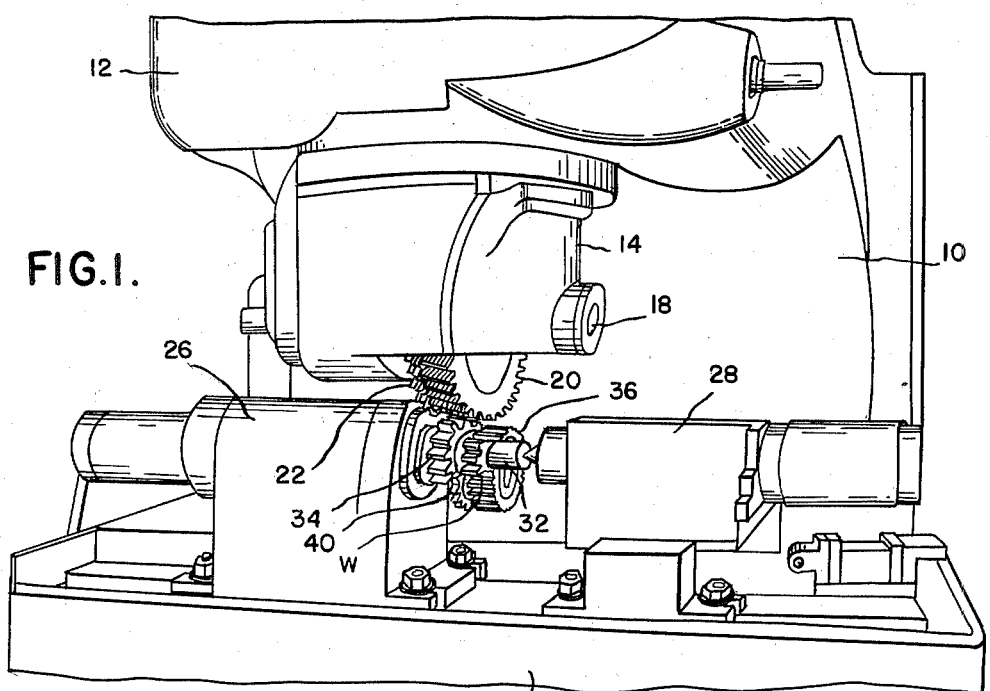
FIG.1.
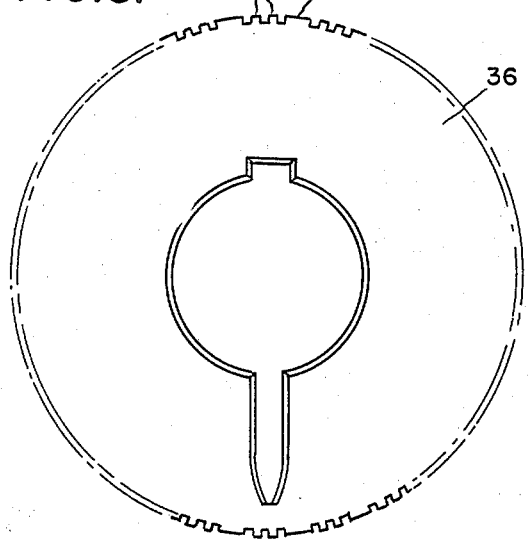
FIG.3.
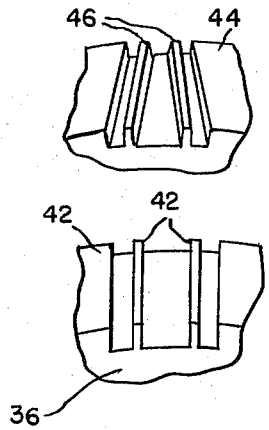
FIG.4.
FIG.5.
INVENTORS
WARREN C. McNABB
RUSSEL W. ANTHONY
BY
Whittemore, Hulbert
& Belknap ATTORNEYS United States Patent Office 2,916,971
Patented Dec. 15, 1959

2,916,971

APPARATUS FOR SIMULTANEOUSLY SHAVING AND DEBURRING THE TEETH OF GEARS

Warren C. McNabb and Russel W. Anthony, Detroit, Mich., assignors to National Broach & Machine Company, Detroit, Mich., a corporation of Michigan Application September 15, 1958, Serial No. 761,067

8 Claims. (Cl. 90—1.6)

The present invention relates to apparatus for simultaneously shaving and deburring the teeth of gears.

It is an object of the present invention to provide apparatus in the form of a machine adapted to rotate a gear-like tooth finishing tool and a separate tooth deburring tool in simultaneous operative relation in engagement with a work gear.

More specifically, it is an object of the present invention to provide apparatus for finishing the teeth of an incomplete gear such for example as a gear sector, which comprises a gear finishing tool and a drive gear on a first spindle, a work arbor having a timing gear secured thereto in mesh with the drive gear on the first spindle and adapted to support an incomplete work gear for rotation with its teeth moving through mesh with the teeth of the gear finishing tool, a second spindle having thereon a driven gear in mesh with said timing gear and a rotary gear deburring tool in operative engagement with the work gear carried by the arbor.

It is a further object of the present invention to provide apparatus as described in the foregoing in which the spindle for supporting the gear finishing tool is disposed at an angle to the arbor and the spindle for supporting the gear deburring tool is parallel to the arbor.

It is a further object of the present invention, as described in the foregoing, to provide a machine in which relative traverse is provided between the work supporting arbor and the gear finishing tool, and in which the gear deburring tool occupies a fixed position with reference to the work gear.

It is a further object of the present invention to provide apparatus as described in the foregoing in which the work support arbor is carried by a movable work support which also carries the deburring tool spindle, and in which the movable work support is traversed during rotation of the spindles and arbor in a plane parallel to the axes of both the gear and gear finishing tool.

Other objects and features of the invention will become apparent as the description proceeds, especially when taken in conjunction with the accompanying drawings, illustrating preferred embodiments of the invention, wherein:

Figure 1 is a fragmentary perspective view of the gear finishing machine of the present invention.

Figure 3 is a side elevational view of the gear deburring tool.

Figure 4 is an enlarged perspective view of a portion of the periphery of the gear deburring tool.

Figure 5 is a view similar to Figure 4 showing a modified form of gear deburring tool.

Figure 2:
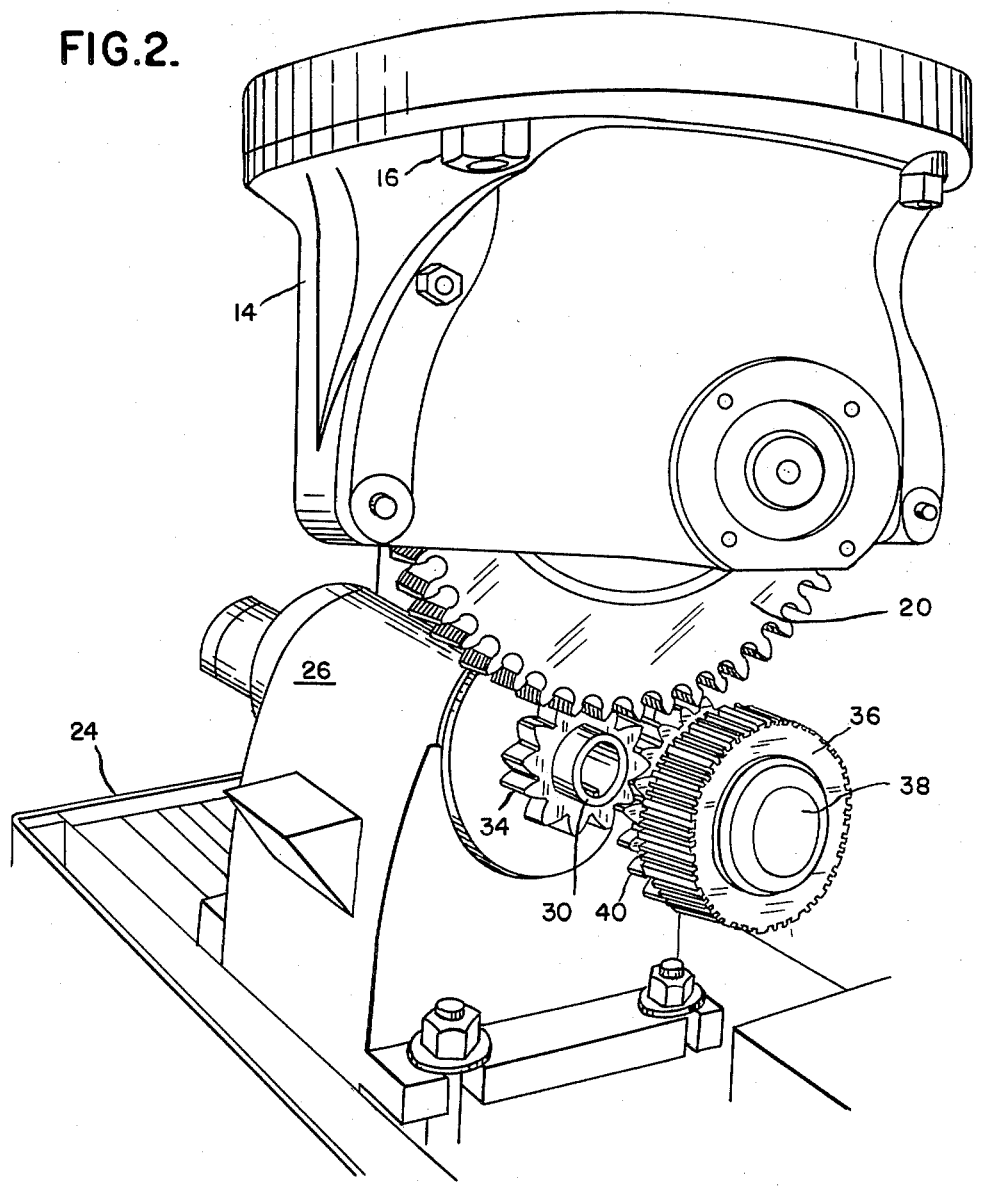
Figure 2 is an enlarged perspective view of the structure with the work piece removed for clarity.

In accordance with the present invention, apparatus is provided for finishing the sides or flanks of a work gear, which may be a complete circular gear or a gear segment as illustrated in Figure 1. This operation may conveniently be a gear shaving operation in which a gear-like shaving tool is provided. In some cases the shaving operation tends to produce burrs at the intersection between the flanks and tops of the gear teeth. In accordance with the present invention a gear deburring tool is provided, which rotates in constant engagement with the teeth of the work gear and hence, operates to remove burrs as they are formed.

The removal of burrs as they are formed has two important advantages. In the first place, in gear finishing operations where relatively heavy burrs are formed, it becomes increasingly difficult to remove the burrs after they have been built up to substantial size. By removing them continuously during the gear shaving operation, a more efficient burr removal is obtained. Secondly, by removing the burrs during the shaving operation it becomes unnecessary to provide a second operation on the gears and this represents economies dependent in part upon the fact that the gears need be handled only once.

Where the work gear, as in the illustrated embodiment of the present invention, is in the form of a gear sector, it becomes necessary to provide positive drive for the work arbor or rotary work support. In conventional gear shaving where the operation is performed on a complete circular gear, the ordinary practice is to mount the work gear for free rotation and to permit it to be driven in rotation only through its meshed engagement with the gear-like shaving tool.

Referring now to the drawings, the gear finishing machine comprises a frame including a column 10 having an overhanging portion 12 to the underside of which is adjustably secured a tool support head 14 mounted for angular adjustment about a vertical axis and retained in position by screws 16. The tool support head includes an arbor 18 on which is fixedly secured a gear finishing tool 20 and a drive gear 22. The drive gear 22 is conveniently made up of two relatively thin gears assembled together and circumferentially adjustable relative to each other so as to provide for backlash elimination.

Mounted on the frame for reciprocation in a horizontal direction is a table 24 on which are mounted a headstock 26 and a tailstock 28. Carried by the headstock 26, as best seen in Figure 2, is a tubular work support arbor 30 having an open end to receive the end of a work gear shaft 32, or a shaft-like fixture if the work gear is not provided with a shaft. The shaft 32 or the corresponding fixture is provided with a key or keyway for engagement with the corresponding keyway or key located within the tubular arbor so that the work gear W, illustrated as a three-tooth sector in Figure 1, may be assembled in accurately located circumferential adjustment with respect to the other structure.

Fixedly secured to the tubular arbor 30 is a timing gear 34 which operates in mesh with the compound driving gear 22. The relationship between the driving gear 22 and the gear finishing tool 20 on the one hand, and the timing gear 34 and the work piece W on the other hand, is of course such that the work gear is driven in properly timed relation with respect to the gear finishing tool 20.

In the gear finishing operation, the tool support head 14 is angularly adjusted in a horizontal plane so that the axis of the tool 20 is crossed in space with reference to the axis of the work gear. It is ordinarily desirable to provide a relative traverse between the work gear and tool during the finishing operation, this traverse taking place in a horizontal plane in the illustrated embodiment of the invention. The actual requirement is that the relative traverse take place in a plane which is parallel to the axes of both the gear and tool. In this plane the actual direction of traverse may be parallel to the work gear W or may be oblique both to the axes of the work gear and tool. This relative traverse is for the purpose of distributing the action of the gear finishing tool longitudinally from end to end of the teeth of the work gear.

The deburring tool is illustrated at 36 and its spindle is a stub shaft 38 carried by the headstock 26, the spindle 38 being parallel to the arbor 30. The illustrated embodiment of the invention contemplates the use of a gear sector forming a part of a generally cylindrical gear. Obviously, if the work gear or gear sector were tapered such as a conical gear, the axis of the deburring cutter would be inclined to the axis of the gear but would be coplanar therewith.

Inasmuch as the spindle 38 carrying the deburring cutter 36 is carried by the headstock 26, traverse of the work table 24 does not of course disturb the relationship between the work gear W and the deburring cutter 36.

Also carried by the deburring tool spindle 38 is a driven gear 40 in mesh with the timing gear 34.

Referring now to Figures 3–5 there is illustrated some details of the deburring cutter 36. Around its periphery the deburring cutter 36 is provided with a plurality of pairs of deburring ribs 42. Intermediate each adjacent pair of deburring ribs 42 there is located a stub tooth 44. Since the deburring tool is driven in timed relation to the work piece W through the timing gear 34 and the driven gear 40, it is unnecessary to provide anything equivalent to true meshing relationship between the teeth of the deburring cutter and gear. The ribs 42 extend generally parallel to the axis of the cutter, this relationship being illustrated in Figure 5. In some cases, if modified teeth are present on the work gear which are tapered from end to end, the ribs such as illustrated at 46 in Figure 4 are provided. These ribs diverge toward one side of the tool. It is also to be understood that in case the teeth of the work gear are disposed on a conical or beveled gear-like body, the periphery of the deburring cutter may be oppositely or otherwise appropriately beveled or inclined to produce the requisite deburring action.

In the gear finishing operation the tool spindle 18 is driven in rotation by a suitable motor (not shown) located in the overhanging portion of the frame. Rotation of the tool spindle is imparted to the work support arbor through the driving gear 22 and timing gear 34 and thence to the work piece W which is accordingly driven in properly timed relation to rotation of the finishing tool 20. At the same time, rotation is imparted to the deburring tool spindle 38 through the timing gear 34 and driven gear 40 and accordingly, each pair of deburring ribs 42 is caused to move in deburring relation to the top corners of each tooth of the work gear W. Accordingly, as the teeth of the work gear are shaved, any burrs built up at the top corners of the teeth are continuously removed and the corners of the teeth are actually deburred continuously by the operation of the deburring cutter 36. The deburring operation takes place simultaneously with the shaving operation and hence, the necessity of a separate handling and second operation on the gears is avoided. Moreover, as previously pointed out, the efficiency of the deburring operation is imprvoed by virtue of the fact that the deburring operation takes place continuously during the shaving operation so that any burrs which might otherwise be built up are removed as formed.

The drawings and the foregoing specification constitute a description of the improved apparatus for simultaneously shaving and deburring the teeth of gears in such full, clear, concise and exact terms as to enable any person skilled in the art to practice the invention, the scope of which is indicated by the appended claims.

What we claim as our invention is:

1. A machine for finishing and deburring gear teeth comprising a tool support including a spindle, gear-like tool and a drive gear fixed to said spindle, a work support, an arbor on said work support, a timing gear fixed to said arbor in mesh with said drive gear, a deburring tool spindle mounted on said work support, a driven gear and a rotary deburring tool on said deburring tool spindle, said rotary driven gear being in mesh with said timing gear, said arbor being arranged to receive and support a work gear in mesh with said tool and in operative engagement with said deburring tool, and means including said driving, timing and driven gears for driving said spindles and arbor in timed relation.

2. A machine for finishing and deburring gear teeth comprising a tool support including a spindle, a gear-like tool and a drive gear fixed to said spindle, a work support, an arbor on said work support, a timing gear fixed to said arbor in mesh with said drive gear, a deburring tool spindle mounted on said work support, a driven gear and a rotary deburring tool on said deburring tool spindle, said rotary driven gear being in mesh with said timing gear, said arbor being arranged to receive and support a work gear in mesh with said tool and in operative engagement with said deburring tool, means for effecting relative traverse between said tool spindle and arbor in a direction which occupies a plane parallel to the axes of said tool spindle and work arbor, and means including said driving, timing and driven gears for driving said spindles and arbor in timed relation.

3. A machine for finishing and deburring gear teeth comprising a tool support including a spindle, a gear-like tool and a drive gear fixed to said spindle, a work support, an arbor on said work support, a timing gear fixed to said arbor in mesh with said drive gear, a deburring tool spindle mounted on said work support, a driven gear and a rotary deburring tool on said deburring tool spindle, said rotary driven gear being in mesh with said timing gear, said arbor being arranged to receive and support a work gear in mesh with said tool and in operative engagement with said deburring tool, means for traversing said work support together with said arbor and deburring tool spindle in a direction which occupies a plane parallel to the axes of said tool spindle and work arbor, and means including said driving, timing and driven gears for driving said spindles and arbor in timed relation.

4. A machine for finishing and deburring gear teeth comprising a tool support including a spindle, a gear-like tool and a drive gear fixed to said spindle, a work support, an arbor on said work support, a timing gear fixed to said arbor in mesh with said drive gear, a deburring tool spindle mounted on said work support, a driven gear and a rotary deburring tool on said deburring tool spindle, said rotary driven gear being in mesh with said timing gear, said arbor being arranged to receive and support a work gear in mesh at crossed axes with said tool and in operative engagement at parallel axes with said deburring tool, and means including said driving, timing and driven gears for driving said spindles and arbor in timed relation.

5. A machine for finishing and deburring gear teeth of a gear sector comprising a tool support including a spindle, a gear-like tool and a drive gear fixed to said spindle, a work support, an arbor on said work support, a timing gear fixed to said arbor in mesh with said drive gear, a deburring tool spindle mounted on said work support, a driven gear and a rotary deburring tool on said deburring tool spindle, said rotary driven gear being in mesh with said timing gear, said arbor being arranged to receive and support a work gear in mesh with said tool and in operative engagement with said deburring tool, and means including said driving, timing and driven gears for driving said spindles and arbor in timed relation.

6. A machine for finishing and deburring the teeth of a work gear comprising a finishing tool support including a spindle for supporting a gear-like finishing tool in mesh with a work gear, a work support including an arbor for supporting the work gear for rotation and a timing gear fixed to said arbor, a deburring tool spindle carried by said work support adapted to carry a rotary deburring tool thereon in operative engagement with the work gear, a driven gear on said deburring tool support in mesh with said timing gear, mean including said timing and driven gears for rotating said spindles and arbor in timed relation, and means for traversing said work support in a direction which occupies a plane parallel to the axes of both said finishing gear spindle and arbor.

7. A machine for finishing and deburring the teeth of a work gear comprising a finishing tool support including a spindle for supporting a gear-like finishing tool in mesh with a work gear, a work support including an arbor for supporting the work gear for rotation and a timing gear fixed to said arbor, a deburring tool spindle carried by said work support adapted to carry a rotary deburring tool therein in operative engagement with the work gear, a driven gear on said deburring tool support in mesh with said timing gear, said arbor being disposed with its axis crossed with respect to the axis of said finishing tool spindle and coplanar with respect to the axis of said deburring tool spindle, means including said timing and driven gears for rotating said spindles and arbor in timed relation, and means for traversing said work support in a direction which occupies a plane parallel to the axes of both of said finishing gear spindle and arbor.

8. A machine for finishing and deburring the teeth of a work gear comprising a finishing tool support including a spindle for supporting a gear-like finishing tool in mesh with a work gear, a work support including an arbor for supporting the work gear for rotation and a timing gear fixed to said arbor, a deburring tool spindle carried by said work support adapted to carry a rotary deburring tool therein in operative engagement with the work gear, a driven gear on said deburring tool support in mesh with said timing gear, said arbor being disposed with its axis crossed with respect to the axis of said finishing tool spindle and parallel to the axis of said deburring tool spindle.

References Cited in the file of this patent

UNITED STATES PATENTS

| | | |
|---|---|---|
| 1,642,179 | Schurr | Sept. 13, 1927 |
| 2,226,018 | Praeg | Dec. 24, 1940 |
| 2,543,985 | Praeg | Mar. 6, 1951 |